April 6, 1954     A. C. BRYAN     2,674,136
CHANGE SPEED TRANSMISSION
Filed Oct. 8, 1948     4 Sheets-Sheet 1
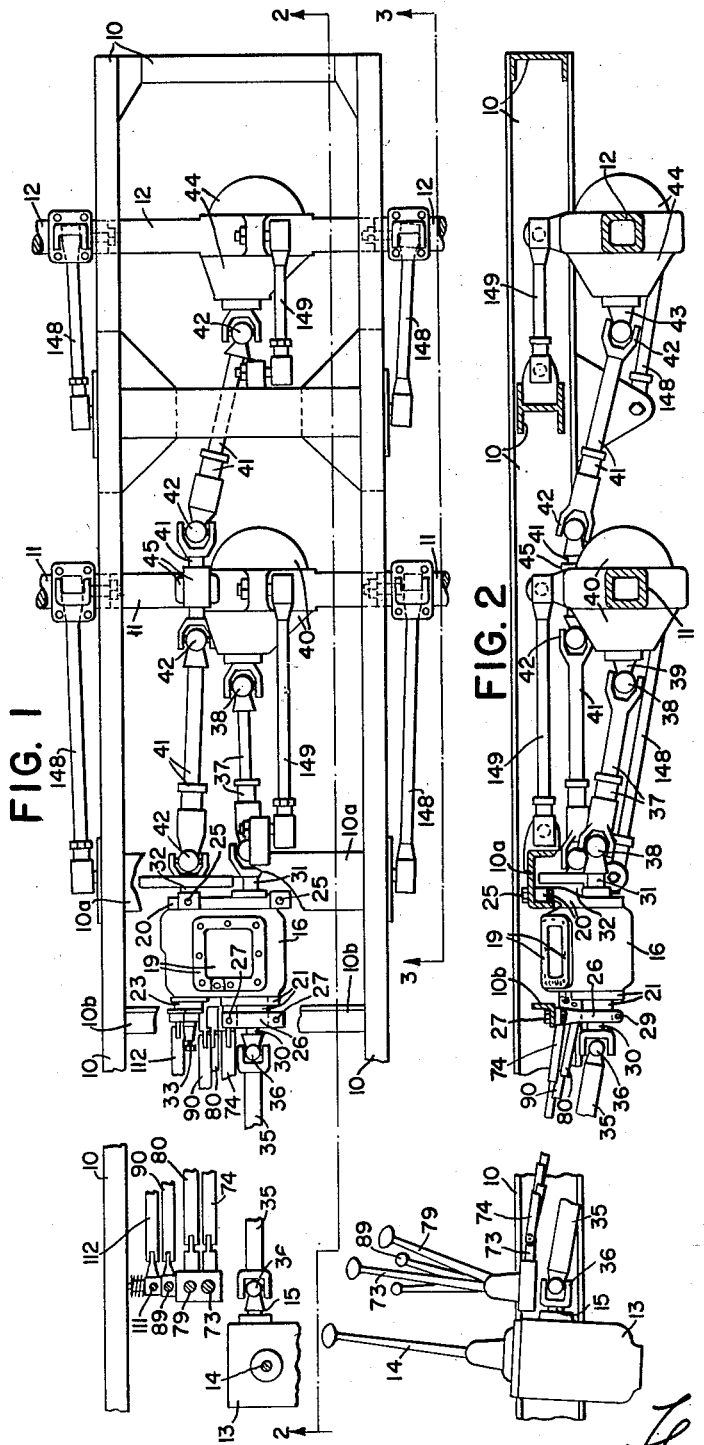
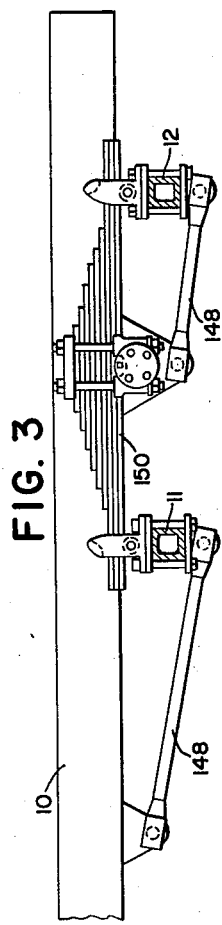
INVENTOR
ARTIS C. BRYAN
BY *Theodore E. Simonton*
ATTORNEY April 6, 1954  A. C. BRYAN  2,674,136
CHANGE SPEED TRANSMISSION
Filed Oct. 8, 1948  4 Sheets-Sheet 2
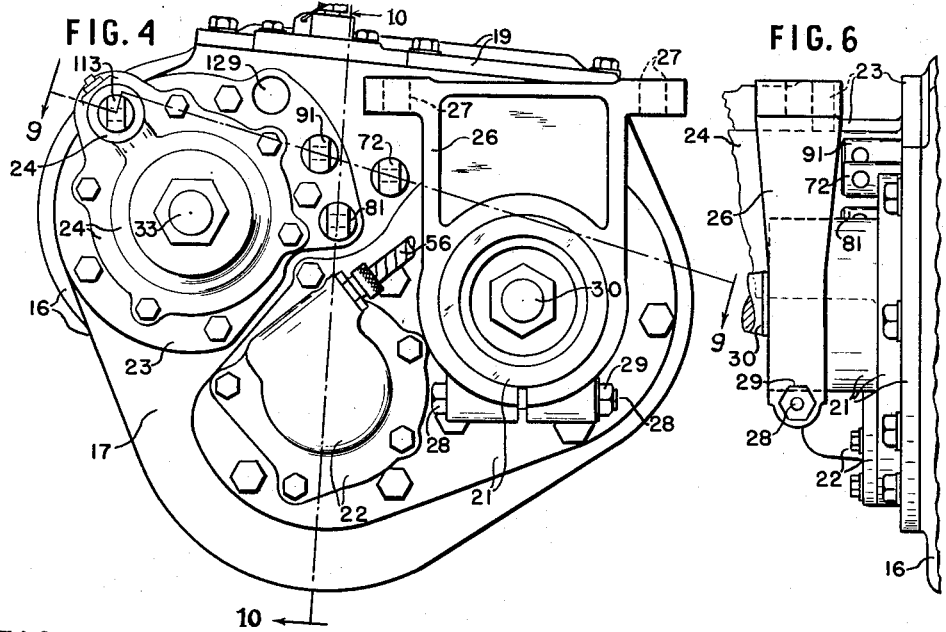
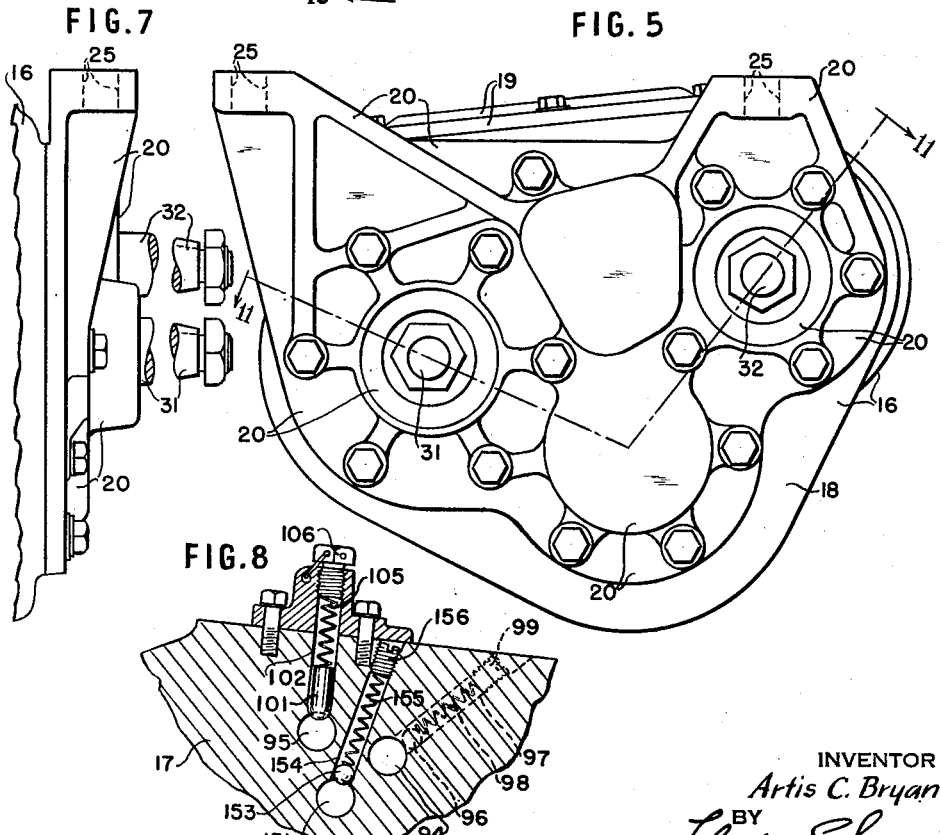
INVENTOR
Artis C. Bryan
BY
Theodore E. Simonton
ATTORNEY April 6, 1954     A. C. BRYAN     2,674,136
CHANGE SPEED TRANSMISSION Filed Oct. 8, 1948     4 Sheets-Sheet 3

INVENTOR
*Artis C. Bryan*
BY
*Theodore E. Simonton*
ATTORNEY

April 6, 1954  A. C. BRYAN  2,674,136
CHANGE SPEED TRANSMISSION
Filed Oct. 8, 1948  4 Sheets-Sheet 4
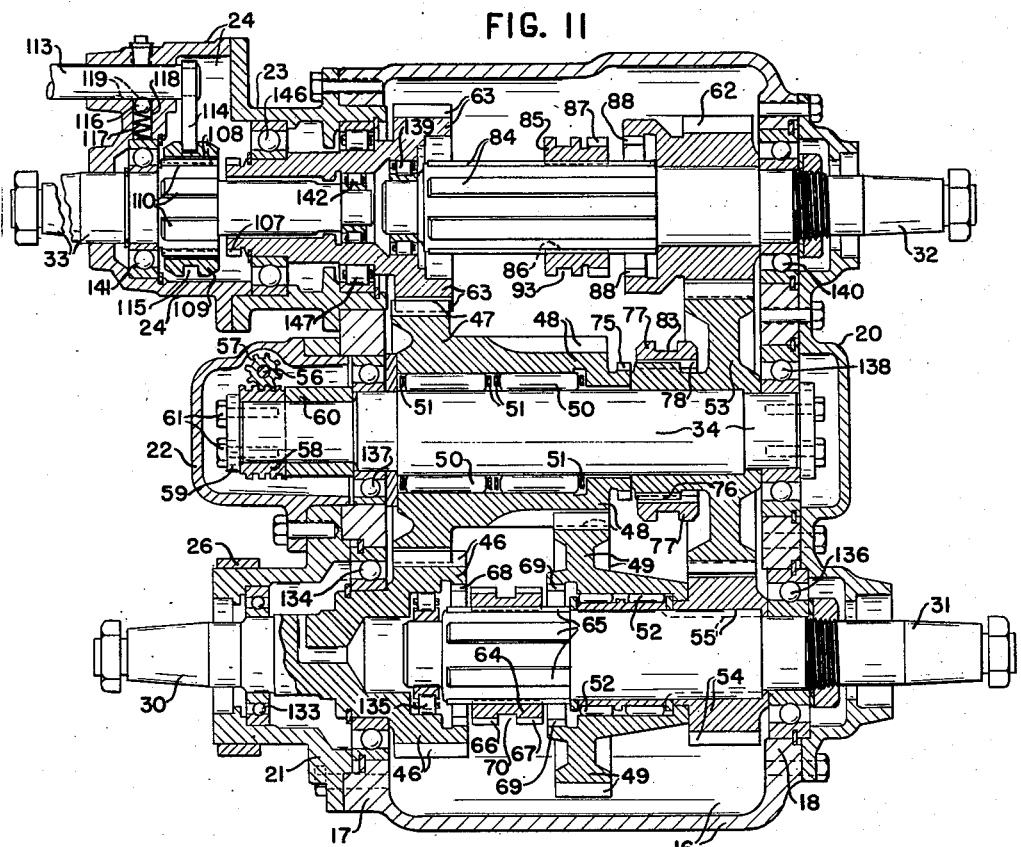
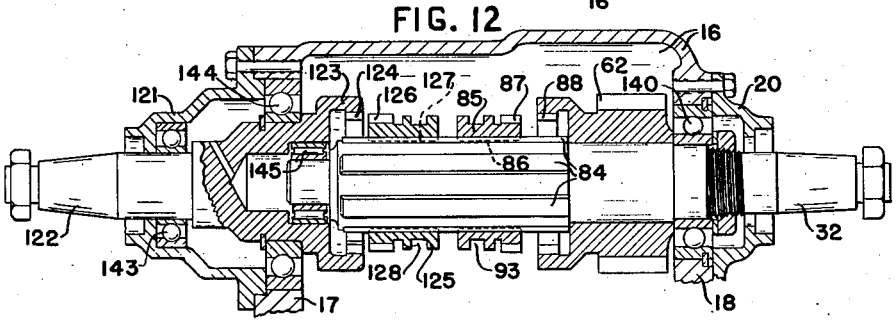
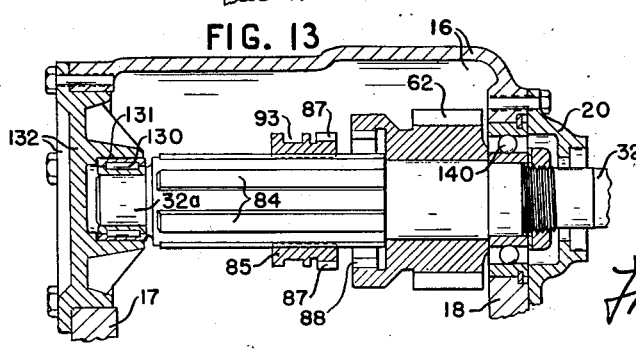
INVENTOR
Artis C. Bryan
BY
Theodore E. Simonton
ATTORNEY Patented Apr. 6, 1954

2,674,136

UNITED STATES PATENT OFFICE 2,674,136

CHANGE SPEED TRANSMISSION

Artis C. Bryan, Syracuse, N. Y.

Application October 8, 1948, Serial No. 53,490

3 Claims. (Cl. 74—665)

The general purpose of the invention is to provide an improved change speed transmission of the constantly meshed gearing type whereby power may be transmitted at will from a rotary power input element to a rotary power output element and, preferably, at will to one or more additional such power output elements at any selected one of three different speed ratios, at least one of which speed ratios preferably is an underdrive ratio.

A further purpose of the invention is to provide a three speed transmission of the constantly meshed gearing type which, notwithstanding its capacity to transmit power at three speeds, is extremely compact and sturdy, of light weight, has a minimum number of shafts and gears, will operate with a minimum of wear and heating, and is adapted to transmit very high torque.

A further purpose of the invention is to provide a three speed transmission of simple and compact construction having a plurality of power output shafts and means for controlling the flow of input power selectively to said output shafts.

A further purpose of the invention is to provide a three speed and power dividing transmission capable of high torque delivery and especially adapted for use as an auxiliary transmission in a motor vehicle equipped with multiple drive axles to control the flow of power selectively to the drive axles of said vehicle from the output shaft of the conventional main change speed transmission of the vehicle.

Other purposes and advantages of the invention will become apparent from the following description of the embodiments of the invention shown in the accompanying drawings.

In the drawings:

Figure 1 is a fragmentary top plan view of a motor vehicle having tandem rear drive axles and equipped with an improved auxiliary transmission embodying the invention in its preferred form;

Figure 2 is a sectional view on the line 2—2 of Figure 1;

Figure 3 is a sectional view on the line 3—3 of Figure 1;

Figure 4 is front end view of the improved transmission assembly;

Figure 5 is a rear end view of the improved transmission assembly;

Figure 6 is a fragmentary side view of the transmission assembly viewed from the right as the assembly is shown in Figure 4;

Figure 7 is a fragmentary side view of the transmission assembly viewed from the left as the assembly is shown in Figure 5;

Figure 8 is a detail sectional view on the line 8—8 of Figure 10;

Figure 11 is a sectional view on the line 11—11 of Figure 5;

Figure 12 is a fragmentary sectional view on the same line as Figure 11 showing one modification of the transmission; and Figure 13 is a fragmentary sectional view on the same line as Figure 11 showing a second modification of the transmission.

Figure 9:
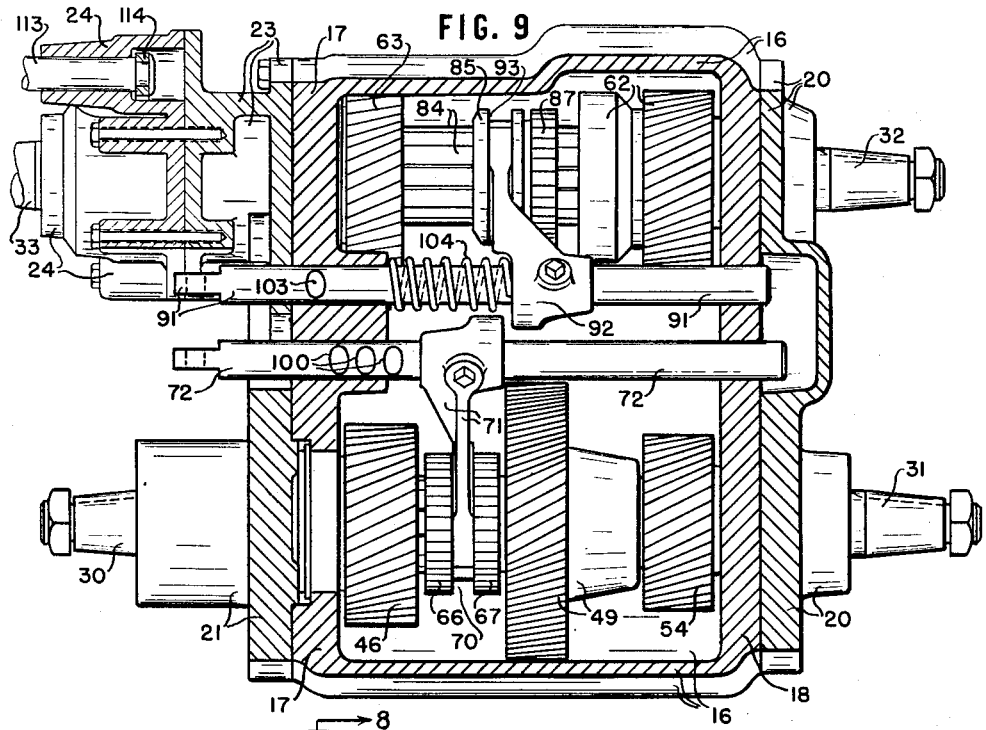
Figure 9 is a sectional view on the line 9—9 of Figure 4 with certain parts omitted for clarity of illustration of other features of the transmission.
Figure 10:
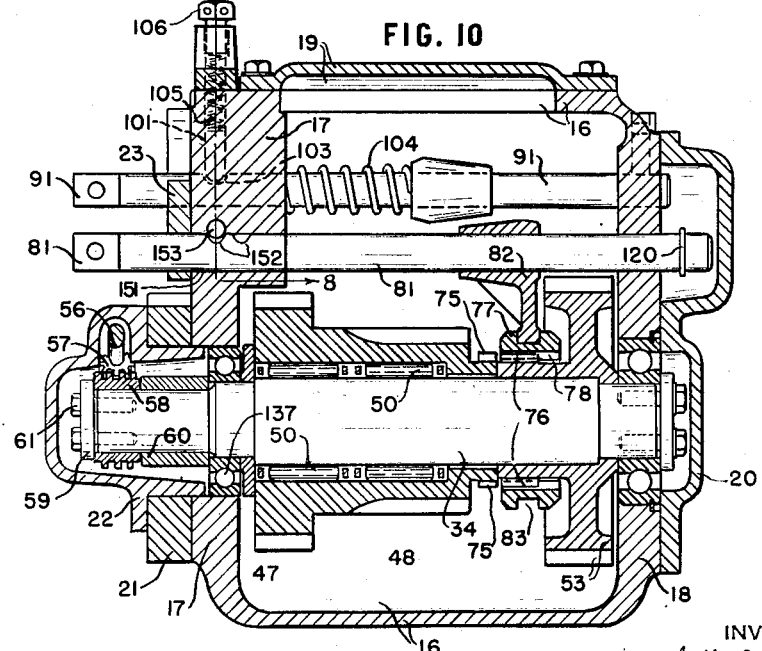
Figure 10 is a sectional view on the line 10—10 of Figure 4.

Referring to the drawings in detail, several forms of change speed transmissions embodying the invention are shown, and the form of transmission illustrated in Figures 1 to 11 of the drawings first will be described. The improved transmission illustrated in Figures 1 to 11 is so constructed and is so arranged in a motor vehicle as to provide a three speed and power dividing auxiliary transmission for the vehicle.

The motor vehicle, only so much of which is shown as is necessary for a full understanding of the invention, has a chassis or frame 10 and two rear driving axles 11 and 12, showing of the usual front axle and engine of the vehicle being omitted. The usual or conventional primary change speed and reverse driving transmission of the vehicle is housed in casing 13 and is selectively controlled by the usual shift lever 14 for driving of the output shaft 15 of said transmission from the vehicle engine to propel the vehicle forwardly and in reverse.

The improved transmission of the present invention is constructed and arranged to transmit power from the output shaft 15 of the primary transmission selectively at any one of three different speeds and also is constructed and arranged for selective division of the received power, and its construction and its arrangement on the vehicle now will be specifically described.

The casing of the improved transmission includes a rigid main hollow body part 16 having integral therewith rigid forward and rear end walls 17 and 18, and also having bolted thereto a detachable cover plate 19 for affording access to the interior of the casing. The casing also includes certain other parts 20, 21, 22, 23 and 24, hereinafter described.

Part 20 is a combined casing end plate and casing hanger which is bolted at 25—25 to a crossbar 10ᵃ of the vehicle chassis and is bolted facewise to the rear wall 18 of the casing body 16. Casing end plate 21 is bolted facewise to the front wall 17 of the casing body, casing part 22 is bolted to plate 21, casing part 23 is bolted to wall 17, and casing part 24 is bolted to part 23. A front hanger 26 for the casing is bolted at 27—27 to a crossbar 16ᵇ of the vehicle chassis, and the lower portion of this hanger is divided and shaped to form a split-ring clamp which is clamped on a cylindrical protuberance of casing part 21 by a bolt 28 and a nut 29.

The casing supports a power input shaft 30, and three power output shafts 31, 32 and 33. The input shaft 30 protrudes from the casing at the front end of the casing. The primary and secondary power output shafts 31 and 32 protrude from the casing at the rear end of the casing and, through connections hereinafter described, drive different ones of the two rear driving axles 11 and 12 of the vehicle. The third or power take-off output shaft 33 protrudes from the casing at the front end of the casing and, as hereinafter explained, is adapted for use to drive auxiliary devices or mechanisms mounted on or off the vehicle.

The shafts 30 and 31 are coaxial, and the shafts 32 and 33 are coaxial and are parallel to the shafts 30 and 31. The casing also supports a single countershaft 34 from which is taken the slight power required to drive the conventional speedometer (not shown) of the vehicle. The axis of the countershaft is equidistant from the common axis of shafts 30 and 31 and the common axis of shafts 32 and 33 and is located to one side of the plane in which said two common axes lie.

The shaft 15 is connected to input shaft 30 to drive the latter by means of a propeller shaft 35 and universal joints 36. Output shaft 31 is connected by a propeller shaft 37 and universal joints 38 with the usual pinion shaft 39 of the conventional differential drive gearing for vehicle axle 11, which gearing is housed in the usual casing 40 carried by said axle. Output shaft 32 is connected by propeller shafting 41 and universal joints 42 with the usual pinion shaft 43 of the differential drive gearing for vehicle axle 12, which gearing is housed in casing 44 carried by said axle. An intermediate section of the shafting 41 is journaled in a bearing 45 carried by axle 11. The protruding end of output shaft 33 may be connected in known ways to any power take-off mechanism such as a winch, crane or other power operated means mounted on or off the vehicle.

The improved change speed gearing whereby the several output shafts 31, 32 and 33 are drivable by the input shaft 30 now will be described.

This gearing is of the constantly meshed gear type and, consequently, the gears may be either of the helical, herringbone or spur gear type. In the construction shown helical gears are provided. The improved gearing is constructed and arranged to afford driving of the output shafts 31 and 32 at either of three speeds with respect to the speed at which the output shaft 15 of the primary transmission is driven, thus affording a very wide total number of speeds at which shafts 31 and 32 may be driven. The speed of drive of the power take-off output shaft 33 changes only with the speed changes imparted to input shaft 30 by the primary transmission. The countershaft 34, as hereinafter explained, always rotates in fixed ratio to the speed of rotation of shafts 31 and 32 and consequently is adapted for use to drive the usual speedometer of the vehicle. The three speed ratios provided in the construction for shafts 31 and 32 with respect to the speed of shaft 30 are direct drive, underdrive and overdrive speeds, respectively, but may be readily changed as hereinafter described.

The primary output shaft 31 in the construction shown is drivable from the input shaft 30 at respectively said direct and underdrive speeds by selectively coupling shaft 31 respectively with gears 46 and 49 of a constantly meshed primary train of power input helical gears 46, 47, 48 and 49, which gear train is constantly driven by the input shaft while shaft 30 is rotated. The leading gear 46 of this train is preferably formed integrally with the input shaft 30 at the inner end of said shaft and is located adjacent the inner face of the front end wall 17 of the transmission casing. The input shaft gear 46 meshes constantly with gear 47 which is constantly positively connected with and is coaxial with the gear 48.

Coaxial gears 47 and 48 are rotatively journaled on the countershaft 34 through the medium of two sets of conventional roller bearings 50—50 in retaining cages 51—51 and are preferably formed integrally with each other as shown. Gear 47 of this cluster gear 47—48 is larger than gear 48 thereof and also is larger than the input shaft gear 46. Gear 47 is located adjacent the inner face of end wall 17 of the casing, and gear 48 also is located substantially midway between the end walls 17 and 18 of the casing and is smaller than and in constant mesh with the other terminal gear 49 of the train. Gear 49 may be aptly termed the underdrive gear and gear 46 may be aptly termed the direct drive gear of the train. Gear 49 is journaled on output shaft 31 coaxially with gear 46 and shaft 30 through the medium of two sets of conventional roller bearings 52—52, and is larger than the other gears of the train and is rotative relatively to shaft 31.

Overdrive of the shaft 31 is selectively effective through the medium of said primary train of power input gears and a secondary train of constantly meshed power input helical gears 53 and 54. Gear 53 is mounted on the countershaft 34 and gear 54 is mounted on the primary output shaft 31, with both gears located adjacent the inner face of the rear end wall 18 of the casing. This train of gears 53—54 runs whenever shaft 31 turns. Gear 54 is keyed or splined to shaft 31 at 55—55 to rotate therewith. Preferably, gear 53 is mounted on countershaft 34 to turn therewith, the hub of said gear, in the construction shown, having a light driven fit on the countershaft. Gear 53, as will hereinafter appear, may be aptly called a combined overdriving and power dividing gear, and gear 54 may be aptly called the primary output shaft drive gear.

For driving the conventional speedometer (not shown) of the vehicle, the usual flexible drive shaft 56 for the speedometer is connected by worm gearing 57—58 with the countershaft 34. Gear 57 is fixed on shaft 56 and meshes with gear 58 which is held to turn with the countershaft. To so hold gear 58 it is mounted on the countershaft and clamped between a rigid disk 59 and a sleeve 60. Sleeve 60 is, as shown, mounted on the countershaft, and said gear 58 and sleeve 60 are clamped endwise together with the sleeve abutting an annular raceway member of a ball bearing assembly 137 hereinafter described and with the gear abutting disk 59 which, in turn, is held against the outer end of the gear by bolts 61 which are threaded into the end of the countershaft. Part 22 of the casing supports and houses the gear 57 and the adjacent end of shaft 56 and also houses the adjacent end of the countershaft and the parts thereon.

For selective driving of the secondary power output shaft 32 in the same direction and at the same speed as the primary output shaft 31 a secondary output shaft drive gear 62 is mounted on shaft 32 with a close running fit to permit relative rotation of said shaft and gear. Gear 62 is of the same diameter and has a set of helical teeth identical with that of the helical drive gear 54 on the primary output shaft. Gear 62 is located adjacent the inner face of casing wall 18 and is in constant mesh with the combined overdriving and power dividing gear 53. As will be more fully hereinafter explained, shaft 32 may be driven at will in direct and underdrive from shaft 31 through the medium of gears 54, 53 and 62 which form a train of constantly meshed gears, and shaft 32 may be driven at will in overdrive through the medium of the above described primary power input gear train for shaft 31 and the gears 53 and 62 by coupling gear 62 to shaft 32 and coupling gear 53 to the cluster gear 47—48.

For selective driving of the power take-off output shaft 33 at speeds varying solely with change of speed of the input shaft 30, there is provided adjacent the inner face of the front wall 17 of the casing a power take-off output shaft drive gear 63 which is a helical gear and is in constant mesh with gear 47 of the cluster gear 47—48. Gear 63 is coaxial with the shafts 32 and 33 and is rotative relatively thereto. To drive the shaft 33 the gear 63 is adapted to be coupled with said shaft as hereinafter explained.

The improved transmission includes four manually selectively operable clutch devices whereby selective driving of the output shafts 31, 32 and 33 may be effected through the medium of the above described gearing. These clutch devices now will be described.

The gears 46 and 49 are axially spaced and formed with opposed axial recesses for movement thereinto of opposite externally toothed ends of a duplex shiftable clutch member or sleeve 64 which is splined on the primary output shaft 31 at 65 to rotate therewith and for axial shifting on said shaft from the neutral position shown in the drawings, in which both sets of clutch teeth 66 and 67 of said member are disconnected from complementary sets of internal clutch teeth 68 and 69 formed on gears 46 and 49 respectively within said recesses, to positively couple either the gear 46 or the gear 49 with shaft 31.

When gear 46 is coupled to shaft 31 said shaft will rotate in the same direction and at the same speed as the input shaft when the latter is driven in either direction by the primary transmission of the vehicle. The speed and direction of the direct drive of the output shaft 31 will of course vary with the speed and direction of drive of the output shaft of the primary transmission. The duplex clutch member 64 has an annular groove 70 between its sets of clutch teeth in which there is engaged a conventional shifter fork 71 fixed to a shifter rod 72 operable from a suitable shift lever 73 on the vehicle through a link connection 74.

To effect overdriving of the primary output shaft 31, the cluster gear 47—48 and the combined overdriving and power dividing gear 53 have adjacent hub end portions thereof formed respectively with like sets of external clutch teeth 75 and 76. An axially shiftable clutch member or sleeve 77 has internal clutch teeth 78 slidable axially of the countershaft 34 between the clutch teeth 76 on gear 53 into and out of clutching engagement with the clutch teeth 75 on the cluster gear 47—48 so that gear 53 may be released from or driven by and in unison with the cluster gear. For shifting the clutch member 77, a suitable shift lever 79 on the vehicle has a link connection 80 with a shifter rod 81 to which is fixed a suitable shifter fork 82 engaged in an annular groove 83 in said clutch member. While separate shift levers 73 and 79 have been shown, for the sake of simplicity, for actuating the links 74 and 80 and their associated shifter rods 72 and 81, it will be obvious that a single lever may be connected with said links in the manner usual in the vehicle transmission art for effecting convenient shifting of a direct and underdrive clutch and an overdrive clutch.

To couple the secondary output shaft 32 and its drive gear 62 to drive said shaft at will concomitantly with the primary output shaft 31 and thereby drive both of the driving axles 11 and 12 of the vehicle at direct, underdrive or overdrive speed, in accordance with the positioning of the previously described shiftable clutch elements 64 and 77, there is slidable axially on a splined portion 84 of shaft 32 a shiftable clutch element 85 having internal splines 86 engaged between the splines of said shaft portion 84 for rotation of said clutch member in unison with said shaft. Said clutch element 85 has a set of external clutch teeth 87 which, by axial movement of said element, are movable into and out of engagement with a set of internal clutch teeth 88 formed on the hub of gear 62.

The clutch element 85 is axially shiftable into and out of clutching engagement with the gear 62 by a shift lever 89 which has a link connection 90 with a shifter rod 91 to which is fixed a shifter fork 92 which is engaged in an annular groove 93 in said clutch element.

When employed, as shown, as an auxiliary transmission for a motor vehicle with plural driving axles, it is desirable whenever the transmission is conditioned for underdrive of the primary output shaft 31 that the secondary output shaft 32 and axle 12 be driven to divide the engine power and thus prevent injurious strain on the drive axle 11 and its driving train. In the improved transmission provision is made for automatically clutching gear 62 to shaft 32 whenever clutch element 64 is shifted to effect an underdrive and to permit instant full coupling of the underdrive gear 49 to shaft 31 whether or not the clutch teeth of clutch element 85 and gear 62 are synchronized for engagement when clutch element 64 is moved toward gear 49. The means whereby this action of the clutch elements 64 and 85 is effected now will be described.

The casing wall 17 is provided with guide bores 94 and 95 respectively for the shifter rods 72 and 91. A ball detent 96 is mounted in a bore 97 in said wall extending to bore 94 and is urged by a spring 98 confined in said bore 97 between the ball and a backing screw 99 to releasably engage in any one of three sockets 100 formed in shifter rod 72 to releasably detent said rod in its neutral and two clutch engaging positions. A plunger detent 101 is slidable in a bore 102 which extends to bore 95 to engage a rounded nose of the plunger in a socket 103 in shifter rod 91 to releasably detent said rod in the clutch disengaging position shown against the force of a spring 104. Spring 104 is compressed between wall 17 and shifter fork 92, and when detent 101 is released is expansible to drive said fork and the shifter rod and shift lever connected therewith to fully engage clutch member 85 with the clutch teeth on gear 62. In the event that the clutch teeth are not synchronized for engagement at the instant said detent is released the spring will hold the two sets of clutch teeth yieldingly abutted end to end until they synchronize and then will fully engage said sets of teeth on clutch element 85 and gear 62. A spring 105 is confined in bore 102 between plunger 101 and a backing screw 106 to urge the plunger to detenting position.

As shown more clearly in Figure 9, the shifter forks 71 and 92 have opposed and normally slightly spaced end portions so that the shifter fork 71 is thrustable laterally against the shifter fork 92 to drive the latter and rod 91 toward clutching position far enough to release detent 101 during shifting of fork 71 from neutral to underdrive clutching position. The spacing of clutch element 64 from gear 49 in the neutral position of said element is lesser than that of clutch element 85 from gear 62 in the detented position of clutch element 85. This spacing and that of the aforesaid opposed end portions of the shifter forks 71 and 92, shown in Figure 9, is such that clutch element 64 may fully engage even while the teeth on clutch element 85 and gear 62 are endwisely abutted. Consequently, inability of the teeth on clutch element 85 and gear 62 to instantly engage upon an underdrive effecting shift of clutch element 64 will not block instant completion of such a shift.

To couple the power take-off output shaft 33 and its drive gear 63 to effect driving of said shaft, the hub of said gear is provided with a set of external clutch teeth 107 between which are engageable a set of internal clutch teeth 108 formed on an axially shiftable clutch element 109 whose teeth, in the unclutching and clutching positions of said element, are engaged between the splines on a splined portion 110 of said shaft.

Clutch element 109 is shiftable by a shift lever 111 which has a link connection 112 with a shifter rod 113 to which is fixed a shifter fork 114 which is engaged in an annular groove 115 in said clutch element. The clutch element is releasably detented in its clutching and unclutching positions by a ball detent 116 and a pressure spring 117 therefor confined in a bore 118 in part 24 of the casing, said ball being releasably engageable in either one of two sockets 119 formed in shifter rod 113.

It will be observed from the drawings that the shifter rods 72, 81 and 91 are guided in bores in both end walls 17 and 18 of the casing and that shifter rod 113 is guided in a bore in part 24 of the casing. Shifter rod 81 is preferably provided with an annular stop collar 120 engageable with casing wall 18.

The modification shown in Figure 12 of the above described transmission now will be described. In this modification there is substituted for the power take-off output shaft 33, its drive gear 63, the clutch mechanism for coupling said shaft and gear, and the casing parts 23 and 24, the parts which now will be described.

For casing parts 23 and 24 there is substituted a casing part 121 bolted to the front end wall 17 of the casing. An output shaft 122 protrudes from this casing part 121 and, adjacent the inner face of end wall 17 of the casing said shaft is formed with an integral clutch element 123 which is recessed to receive the adjacent end of the splined portion 84 of the secondary output shaft 32 of the transmission above described and is provided in said recessed portion with a set of internal clutch teeth 124.

To couple the output shaft 122, which protrudes from the front end of the transmission casing, with output shaft 32 to rotate with shaft 32 when the latter is rotated by the means heretofore described, there is provided an axially shiftable clutch element 125 having a set of external clutch teeth 126 for engagement between the clutch teeth 124 of clutch element 123. This clutch element 125 has internal splines 127 engaged between the splines of the splined part 84 of the secondary output shaft 32 so that said element rotates with shaft 32. Said axially shiftable clutch element may be shifted into clutch and unclutched position by a shifter fork, shifter rod, a shift lever and a link connection between the shift lever and shifter rod similar to those shown and above described for the other axially shiftable clutch elements, said element 125 having a shifter fork receiving groove 128. The shifter rod carrying the shifter fork for clutch element 125 extends through the front of the casing at 129 (Figure 4).

The modified embodiment of the invention shown in Figure 12 and next above described provides an output shaft 122 drivable only from the secondary output shaft 32 and which rotates only with said shaft 32. Shaft 122 is therefore adapted for use not only as a vehicle speed power take-off shaft to drive auxiliary devices, such as winches and other auxiliary or associated power driven devices mounted on or off the vehicle, but also is adapted for connection in the known manner with a front driving axle of a vehicle designed for a 6 x 6 drive, i. e., a vehicle having two rear driving axles and a front driving axle.

The modified embodiment shown in Figure 13 of the above described transmission illustrated in Figures 1 to 11 now will be described. In this embodiment of the invention no front output shaft is provided. The secondary output shaft 32 has a reduced forward end portion 32ª thereof journaled in a conventional set of roller bearings 130 in a recess 131 in the inner portion of a casing part 132 which is bolted to the front end wall 17 of the casing in substitution for the parts 23—24 of the construction shown in Figures 1 to 11 or part 121 of the construction shown in Figure 12.

Other modifications of the invention as specifically shown and heretofore described will readily be apparent to those skilled in the art. For example, it will be apparent that the speedometer drive, and also the output shafts 32, 33 and 122 with their associated drive gears and clutches may be omitted, and it also will be apparent that the transmission may be employed in its several illustrated forms, and with or without the omission of shafts 32, 33 and 122, for other purposes than an auxiliary transmission for a motor vehicle and may be employed wherever a three speed transmission with a single output shaft is desirable.

It will be observed from the drawings, and particularly from the V-shaped section line 11—11 on which Figure 11 is taken, that the shafting and gearing of the improved three speed transmission are arranged in a compact and substantially V-shaped trough formation which contributes to compactness of the transmission as a whole and also affords ample internal space within said formation for the shifter rods 72, 81, and 91 and their connected shifter forks. Also it will be noted that the dimensions of the transmission are small in all directions notwithstanding the fact that provision is made within the transmission for three output speeds and also for at least three output shafts adapted for transmitting high torque.

The construction and arrangement of the shafts and gears and their bearings in the improved transmission are such as to provide a very compact and sturdy transmission adapted to transmit very high torque with safety, with substantially no liability of cramping of parts, and with a minimum of wear and heating of parts.

The several shafts are, as shown, sturdy short shafts of relatively large diameter with respect to the gears thereon, and the shafts and gears have wide cramp resisting bearings either in the form of wide continuous bearings or sets of spaced bearings. The input shaft 30 is journaled in two widely spaced sets of ball bearings 133 and 134, the primary output shaft 31 is journaled in a set of roller bearings 135 and a set of ball bearings 136 which sets are widely spaced, the countershaft 34 is journaled in two widely spaced sets of ball bearings 137 and 138, the secondary output shaft 32 is journaled in a set of roller bearings 139 and a set of ball bearings 140 which sets of bearings are widely spaced, and the power take-off output shaft 33 is journaled in a set of ball bearings 141 and a widely spaced set of roller bearings 142.

The set of bearings 135 pilots and journals a reduced forward end portion of shaft 31 in the axial recess in gear 46. The set of bearings 139 pilots and journals a reduced forward end portion of shaft 32 in an axial bore of gear 63, and the set of bearings 142 journals a reduced rear end portion of shaft 33 in an axial bore in the hub of said gear 63. In the modified construction shown in Figure 12, shaft 122 is journaled in widely spaced sets of ball bearings 143 and 144 and the reduced forward end portion of shaft 32 is journaled in a set of roller bearings 145 in the axial recess in clutch member 123.

The gears also have wide hubs affording anti-cramp bearings. The hub of gear 63 is journaled in two widely spaced sets of bearings, the set of ball bearings 146 and the set of roller bearings 147.

Another feature of the transmission is that the countershaft 34 is free of keyways, splines and the like and never transmits any substantial torque. The only torque transmitted by this shaft is the negligible torque required to drive the speedometer. It will be obvious that the speedometer take-off may be omitted.

The above described anti-cramping features of the transmission obviously serve to reduce wear and heating. A further feature of the transmission which also contributes to reduction of heating resides in the fact that while the input shaft is being driven with the vehicle stationary, the cluster gear revolves on its roller bearings on the countershaft which is then stationary, and while the vehicle is being propelled by power said cluster gear and the countershaft both rotate in the same direction and also the sets of bearings between said gear and shaft rotate bodily in the same direction as the gear and shaft.

The overdrive in the transmission may be changed to a second underdrive, as is sometimes desirable, simply by reducing the diameter of the overdrive gear 53 and enlarging the diameters of the two gears 54 and 62 meshed therewith.

The driving axle assemblies 11 and 12 are supported in known manner from the vehicle chassis by suspension springs 150. Preferably, each axle assembly is connected with the chassis by two torque rods 148—148 located adjacent opposite sides of the vehicle and a third torque rod 149 located substantially medially of the sides of the vehicle. The three torque rods for each axle assembly all extend forward from said assembly and are arranged to guide the axle assemblies for independent substantially vertical movement and to resist rolling of the axle assemblies bodily during driving and braking of the vehicle. The forward ends of the torque rods are pivoted to suitable brackets on the chassis and their rear ends are pivoted to the axle assemblies, each rod 148 being pivoted to its associated axle assembly at the bottom of said assembly and each rod 149 being pivoted to its associated axle assembly at the top of the assembly. The rod 149 of each set of three torque rods is slightly shorter than the other two rods of said set and is pivoted to the chassis slightly farther toward the rear end of the chassis than the other two rods of the set.

Preferably, the shifter rod 81 for shifter fork 82 is releasably detented to releasably hold clutch element 77 in its clutching and unclutching positions. Said shifter rod is guided in a bore 151 in casing wall 17 and is provided with two detent sockets 152 in which are engageable a ball detent 153. Ball detent 153 is mounted in a bore 154 in wall 17, and a spring 155 is confined in bore 154 between the ball detent and a backing screw 156 to urge the ball detent against the shifter rod.

While there are herein described and in the drawings shown illustrative embodiments of the invention, it is to be understood that the invention is not limited thereto, but may comprehend other constructions, arrangement of parts, details and features without departing from the spirit of the invention. I desire to be limited, therefore, only by the scope of the appended claims.

I claim:

1. A change speed transmission having an input shaft and a first output shaft in axial alignment, a countershaft opposite and parallel to said aligned shafts, a second output shaft parallel to said first output shaft, a third output shaft in axial alignment with said second output shaft, means journalling all of said shafts for independent rotation, a gear fixed on the countershaft and rotation of which gear is always required to rotate said countershaft, a two-gear cluster gear rotatively journaled on the countershaft alongside the gear fixed on said countershaft, toothed clutch means relatively shiftable to directly clutch said gears together and to unclutch said gears, a gear fixed on the input shaft in constant mesh with the outermost gear of the cluster gear, a gear rotatively journaled on the first output shaft in constant mesh with the innermost gear of the cluster gear, toothed clutch means relatively shiftable to clutch the first output shaft selectively to the gear fixed on the input shaft or to the gear rotatively journaled on the first output shaft and also to disconnect the first output shaft from both said gears, a gear fixed on the first output shaft in constant mesh with the gear fixed on the countershaft, a gear rotatively journaled on the second output shaft in constant mesh with the gear fixed on the countershaft, toothed clutch means relatively shiftable to clutch and unclutch the second output shaft and the gear journaled thereon, and toothed clutch means for clutching said third output shaft to and unclutching it from a member rotating at a speed dependent upon the speed of said input shaft.

2. A change speed transmission, as claimed in claim 1, wherein said last-named member is a gear journaled for rotation about said third output shaft in constant mesh with the outermost gear of the cluster gear.

3. A change speed transmission having an input shaft and a first output shaft in axial alignment, a countershaft opposite and parallel to said aligned shafts, a second output shaft parallel to said first output shaft, a third output shaft in axial alignment with said second output shaft, means journalling all of said shafts for independent rotation, a gear fixed on the countershaft and rotation of which gear is always required to rotate said countershaft, a two-gear cluster gear rotatively journaled on the countershaft alongside the gear fixed on said countershaft, toothed clutch means relatively shiftable to directly clutch said gears together and to unclutch said gears, a gear fixed on the input shaft in constant mesh with the outermost gear of the cluster gear, a gear rotatively journaled on the first output shaft in constant mesh with the innermost gear of the cluster gear, toothed clutch means relatively shiftable to clutch the first output shaft selectively to the gear fixed on the input shaft or to the gear rotatively journaled on the first output shaft and also to disconnect the first output shaft from both said gears, a gear fixed on the first output shaft in constant mesh with the gear fixed on the countershaft, a gear rotatively journaled on the second output shaft in constant mesh with the gear fixed on the countershaft, toothed clutch means relatively shiftable to clutch and unclutch the second output shaft and the gear journaled thereon, and toothed clutch means for clutching said third output shaft to and unclutching it from said second output shaft.

References Cited in the file of this patent

UNITED STATES PATENTS

| Number | Name | Date |
|---|---|---|
| 1,916,501 | Tenney | July 4, 1933 |
| 2,085,322 | Lapsley | June 29, 1937 |
| 2,314,833 | Keese | Mar. 23, 1943 |
| 2,344,388 | Bixby | Mar. 14, 1944 |
| 2,356,522 | Kummich | Aug. 22, 1944 |
| 2,395,108 | Donley et al. | Feb. 19, 1946 |
| 2,397,587 | Armantrout | Apr. 2, 1946 |
| 2,431,727 | Bennett | Dec. 2, 1947 |

FOREIGN PATENTS

| Number | Country | Date |
|---|---|---|
| 450,247 | France | Jan. 14, 1913 |
| 799,949 | France | Apr. 20, 1936 |